US008369338B1

(12) United States Patent
Peng et al.

(10) Patent No.: US 8,369,338 B1
(45) Date of Patent: Feb. 5, 2013

(54) REGION-ASSOCIATED RATINGS OF WIRELESS CARRIERS

(75) Inventors: Shih-Ta Peng, Bellevue, WA (US); Charles Steven Johnson, Snohomish, WA (US); Aaron C. Rubenson, Seattle, WA (US); Gregor Alan Moulton, Austin, TX (US)

(73) Assignee: Amazon Technologies, Inc., Reno, NV (US)

( * ) Notice: Subject to any disclaimer, the term of this patent is extended or adjusted under 35 U.S.C. 154(b) by 276 days.

(21) Appl. No.: 12/787,048

(22) Filed: May 25, 2010

(51) Int. Cl.
*H04L 12/28* (2006.01)
*H04L 12/56* (2006.01)
*H04B 17/00* (2006.01)

(52) U.S. Cl. .................. 370/395.2; 455/67.11
(58) Field of Classification Search .................. None
See application file for complete search history.

(56) References Cited

U.S. PATENT DOCUMENTS

| 8,131,301 B1* | 3/2012 | Ahmed et al. ............... 455/446 |
| 2004/0006601 A1* | 1/2004 | Bernstein et al. ............ 709/207 |
| 2005/0170854 A1* | 8/2005 | Benco et al. ................ 455/461 |
| 2008/0132217 A1* | 6/2008 | Roth et al. .................. 455/418 |
| 2010/0145814 A1* | 6/2010 | Meghani et al. ............. 705/26 |
| 2011/0286437 A1* | 11/2011 | Austin et al. ................ 370/338 |

OTHER PUBLICATIONS

Consumerreports.org, Top Cell Phone Service Providers by City, Dec. 2009—Consumer Reports Magazine Issue: Jan. 2010, pp. 1-6.
AT&T Coverage Viewer, retrieved on May 25, 2010, http://www.wireless.att.com/coverageviewer/partner.jsp?zip=98006#?type=voice&lat=47.537091675861&lon=-122.10465681568431&sci=8, 5 pages.

* cited by examiner

*Primary Examiner* — Xavier Szewai Wong
(74) *Attorney, Agent, or Firm* — Thomas | Horstemeyer, LLP

(57) ABSTRACT

Disclosed are various embodiments for collecting and presenting region-associated ratings of wireless carriers. Customer ratings for a plurality of wireless carriers are collected in one or more computing devices. Each of the customer ratings is associated with a corresponding geographic location. A target geographic location is obtained from a client. A network page is generated including one or more maps showing a region encompassing the target geographic location. The maps indicate an aggregate customer rating for one or more of the wireless carriers for the region. The aggregate customer rating is determined based at least in part on a subset of the customer ratings that are associated with geographic locations that are encompassed by the region.

26 Claims, 6 Drawing Sheets

REGION-ASSOCIATED RATINGS OF WIRELESS CARRIERS

BACKGROUND

Several wireless carriers purport to provide nationwide wireless service in the United States. However, not all areas are serviced by all of the carriers. In particular, rural areas that are not near an Interstate highway are often without coverage from at least some of the national wireless carriers. Even urban areas may have gaps in coverage due to terrain and other factors. In addition, some wireless carriers are regional and may provide wireless service only in certain metropolitan areas.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to collecting and presenting region-associated ratings of wireless carriers. Customer ratings and reviews of wireless carriers are collected and associated with a respective geographic region. The resulting ratings and reviews are then presented to a user by way of a map or other visualization so that a user may compare several wireless carriers that provide service to a specified region in one or more dimensions. In some embodiments, a recommendation of a wireless carrier for the specified region may be presented to the user. In the following discussion, a general description of the system and its components is provided, followed by a discussion of the operation of the same.

Figure 1:
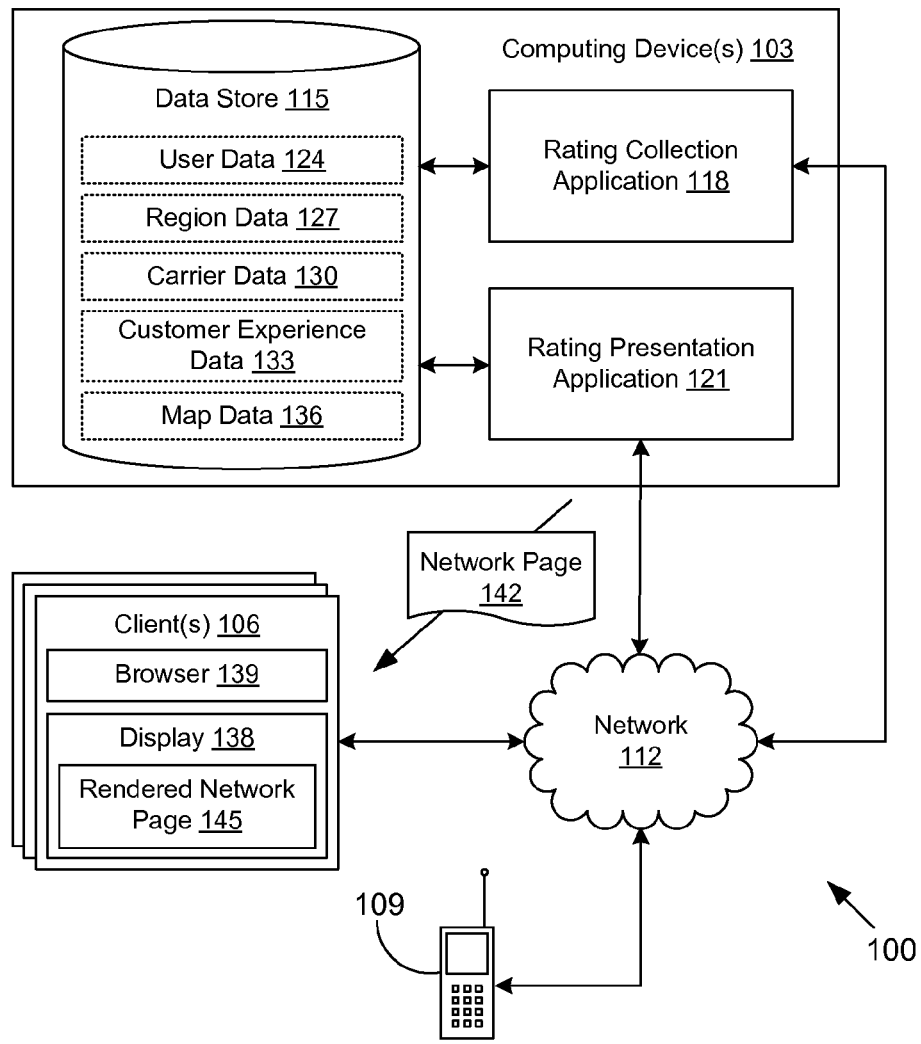
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and/or one or more wireless devices 109 by way of a network 112. The network 112 includes, for example, the Internet, intranets, extranets, wide area networks (WANs), local area networks (LANs), wired networks, wireless networks, cellular networks, telephone networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a rating collection application 118, a rating presentation application 121, and other applications, services, processes, systems, engines, or functionality not discussed in detail herein. The rating collection application 118 is executed to solicit and/or collect feedback from wireless customers regarding their experiences with wireless carriers at a geographic location or area. The rating presentation application 121 is executed to present recommendations based at least in part on the customer feedback and/or generate visualizations of the customer feedback for the wireless carriers that provide service in a specified geographic location or area.

The data stored in the data store 115 includes, for example, user data 124, region data 127, carrier data 130, customer experience data 133, map data 136, and potentially other data. The user data 124 may comprise any data relating to users of the rating collection application 118 and/or the rating presentation application 121. As a non-limiting example, user data 124 may store user account data and user credentials such as username and password combinations, etc., to be used in authenticating users. The region data 127 may define regions that may be matched to geographic locations. As non-limiting examples, region data 127 may include postal code regions such as zip code regions, subregions within postal code regions such as zip+4 code regions, subdivisions, neighborhoods, cities, towns, counties, boroughs, parishes, census-designated areas, territories, states, provinces, and/or other regions. The carrier data 130 may comprise data relating to a plurality of wireless carriers, such as, for example, wireless service plan information, features associated with wireless service plans, pricing information, area coverage, and other data.

The customer experience data 133 may include any type of customer feedback data for the wireless carriers. To this end, the customer experience data 133 may include ratings and reviews of the wireless carriers in one or more dimensions. Such dimensions may relate to various features offered by the wireless carrier and/or characteristics associated with the service of the wireless carrier. Non-limiting examples of dimensions of the customer ratings/reviews may include voice coverage, data coverage, data throughput, call clarity, customer service, pricing, text messaging, supported wireless devices, and so on. The customer experience data 133 may include textual reviews, ratings on numerical scales, ratings on other scales such as from "poor" to "excellent," etc.

The map data 136 may include any data relating to the generating of maps for the regions in the region data 127. As non-limiting examples, the map data 136 may describe regional boundaries, streets, place names, notable places, water features, and other geographic features. In one embodiment, the map data 136 may include graphical maps onto which additional features may be overlaid.

The client 106 is representative of a plurality of client devices that may be coupled to the network 112. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 106 may include a display 138. The display 138 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 139 and/or other applications. The browser 139 may be executed in a client 106, for example, to access and render network pages 142, such as web pages, or other network content served up by the computing device 103 and/or other servers. A rendered network page 145 may be displayed on the display 138. The client 106 may be configured to execute applications beyond browser 139 such as, for example, email applications, instant message applications, and/or other applications.

The wireless device 109 is representative of a plurality of wireless-capable devices that may be coupled to the network 112 by way of a wireless network. In various embodiments, the wireless device 109 may comprise a cellular telephone, a tablet computer, a personal digital assistant, and/or other devices. In some embodiments, the wireless device 109 may be capable of executing client applications to facilitate the collection of customer experience data 133 for the rating collection application 118. In other embodiments, the wireless device 109 may facilitate the collection of customer experience data 133 by way of an interactive voice interface or other interface provided over a voice channel.

Next, a general description of the operation of the various components of the networked environment 100 is provided. To begin, a multitude of users may be registered and assigned accounts that may be stored in the user data 124. The user accounts may be preexisting and/or the users may be authenticated by way of an external computer system. When the identity of the user has been verified, the user may be presented with an interface to provide feedback regarding a wireless carrier.

To this end, the rating collection application 118 may generate one or more network pages 142 configured for the collection of customer experience data 133 regarding the wireless carrier. Such network page(s) may be sent over the network 112 to the client 106 associated with the user and rendered by the browser 139 on the display 138 as a rendered network page 145. Alternatively, or additionally, the interface may be provided to the user on a wireless device 109. Such an interface may comprise a network page 142, an interactive voice interface, or some other interface.

The rating collection application 118 thereby collects a plurality of customer ratings for a plurality of wireless carriers from a multitude of users. In various embodiments, customer ratings may be collected from unverified users. In one embodiment, customer ratings may be collected both from unverified users and from verified users. In such a case, the ratings from the verified users may be assigned a greater weight or significance over the ratings from the unverified users. Ratings from verified users may be preferred in order to ensure that users do not submit multiple ratings or otherwise submit ratings with questionable validity. As non-limiting examples, other than examining stored credentials, verification may involve examining the internet protocol (IP) address of the user, examining a cookie stored by the browser 139, examining the area code and prefix of a telephone number associated with the user to confirm the identity of the wireless carrier, and other forms of verification.

The customer ratings may be multi-dimensional. In one embodiment, a user may be presented with a number of questions regarding the wireless carrier and the satisfaction of the user with the wireless carrier. As non-limiting examples, a user may be asked to rate the voice coverage, call clarity, data coverage, data throughput, price, service plans, text messaging, customer service, and other features and qualities regarding the wireless carrier. Each of these factors may be considered as a separate dimension of the customer rating. Some of these factors may be specific to certain ones of the wireless carriers as determined by the carrier data 130. In one embodiment, a wireless device 109 may be configured to report data relating to one or more of these factors to the rating collection application 118 automatically.

Each of the customer ratings is associated with a geographic location or region. Non-limiting examples of a geographic location may include an address, a postal code such as a zip code, latitude and longitude coordinates, city name, state name, etc. In one embodiment, the user may be asked to provide a geographic location or region to the rating collection application 118 in conjunction with providing the review of the wireless carrier. In another embodiment, a geographic location or region may be already stored in the user data 124 as part of a prior registration process for the user. In other embodiments, the geographic location or region may be determined automatically by the rating collection application 118. As non-limiting examples, geolocation may be performed using the IP address or telephone number associated with the user. As another non-limiting example, a location may be determined from the wireless device 109 through a global positioning system (GPS) device or by way of triangulation or trilateration according to multiple fixed wireless base stations.

Where a geographic location rather than a region is collected or determined for the user, a region encompassing the geographic location may be determined using the region data 127. In one embodiment, when a user provides a street address as a geographic location, the rating collection application 118 may determine a postal code associated with the street address as the region. The region and/or geographic location identified for the user may be stored in user data 124 and/or the customer experience data 133.

In one embodiment where the geographic location is collected from the user, a user interface including a map may be presented to the user. The user may, for example, zoom and/or pan through the map to a region. The user may then select the region or select a location within the region. As a non-limiting example, a user may generate a mouse click when the cursor is above a desired point on the map to select that point on the map. A geographic location may be specified by a user in this way and collected by the rating collection application 118.

After the customer ratings of the wireless carriers are collected, a user may access a presentation of the customer ratings. To this end, a user at a client 106 may provide a geographic location or region to the rating presentation application 121. In one embodiment, the geographic location or region may be determined automatically by the rating presentation application 121 according to a geolocation of the IP address associated with the client 106, a previously stored geographic location or region associated with the user, or other data and processes. Where a geographic location is provided or determined, a target region may be determined from the geographic location according to the region data 127. The geographic location or region is used to present customer ratings in association with the target region.

It may be the situation that not all of the wireless carriers provide service to the target region. Accordingly, the rating presentation application 121 may determine a subset of the wireless carriers that offer service to the target region according to the carrier data 130 and/or other data. The rating presentation application 121 may then determine the customer ratings that are associated with the target region and the subset of the wireless carriers. The customer ratings associated with the region may be used, for example, to recommend one or more of the subset of the wireless carriers to the user.

The rating presentation application 121 may then generate one or more network pages 142 that present the customer ratings for the target region. The network pages 142 may be sent to the client 106 by way of hypertext transfer protocol (HTTP) or another protocol through a network page server component executing on the computing device 103 such as Apache® HTTP Server, Microsoft® Internet Information Services (IIS), or another server. The network page(s) 142 may include a recommendation of one or more wireless carriers from the subset of the wireless carriers. Such a recommendation may be based, for example, on the customer ratings from the target region and other criteria specified by the user.

Visualizations of the customer ratings may also be presented. In one embodiment, one or more maps are generated to show an aggregate rating for each one of the subset of the wireless carriers. The aggregate rating is determined from the customer ratings associated with the target region. The aggregate rating for the carrier may be indicated by a color, pattern, or other indicia. The aggregate rating may correspond to an overall customer rating for the wireless carrier. Alternatively, multiple aggregate ratings may be presented for each wireless carrier, for example, with one aggregate rating for each dimension or factor of the customer ratings.

In one embodiment, maps may be generated showing the target region surrounded by one or more other regions, which may also indicate aggregate customer ratings for the respective regions. In one embodiment, a separate map may pertain to each of the wireless carriers for the target region. The dimensions indicated by the map may be user selectable. Multiple aggregate ratings may be displayed concurrently for a wireless carrier in some embodiments. Maps may be provided, for example, for wireless carriers that service the target region and/or any other region shown by at least one of the maps.

In one embodiment, a map may allow comparison of an aggregate rating of one wireless carrier with an aggregate rating of another wireless carrier for the target region and surrounding regions. To this end, multiple overlapping colors and/or patterns and/or other indicia may be used, where the color/pattern/indicia is associated with a distinct level of rating for one of the carriers and a different color/pattern/indicia is associated with the same level of rating for another one of the wireless carriers. In other words, the color/pattern/indicia may be unique with respect to levels of rating and wireless carriers.

Where multiple maps are displayed on a rendered network page 145, the maps may be rendered in a same display region or different display regions or windows. Where the maps are rendered in a same display region, one or more components may be provided in the rendered network page 145 to enable the user to toggle which map is rendered in the common display region. When a different map is rendered, a request for additional data may be sent to the rating presentation application 121. Such a request, for example, may be performed and answered asynchronously using Ajax or another technology. The rendered network page 145 may be updated using Java Script, dynamic hypertext markup language (DHTML), and/or other technologies. In other embodiments, different maps are available through different network pages 142. Specific examples of rendered network pages 145 will be described in connection with the following two figures.

Figure 2:
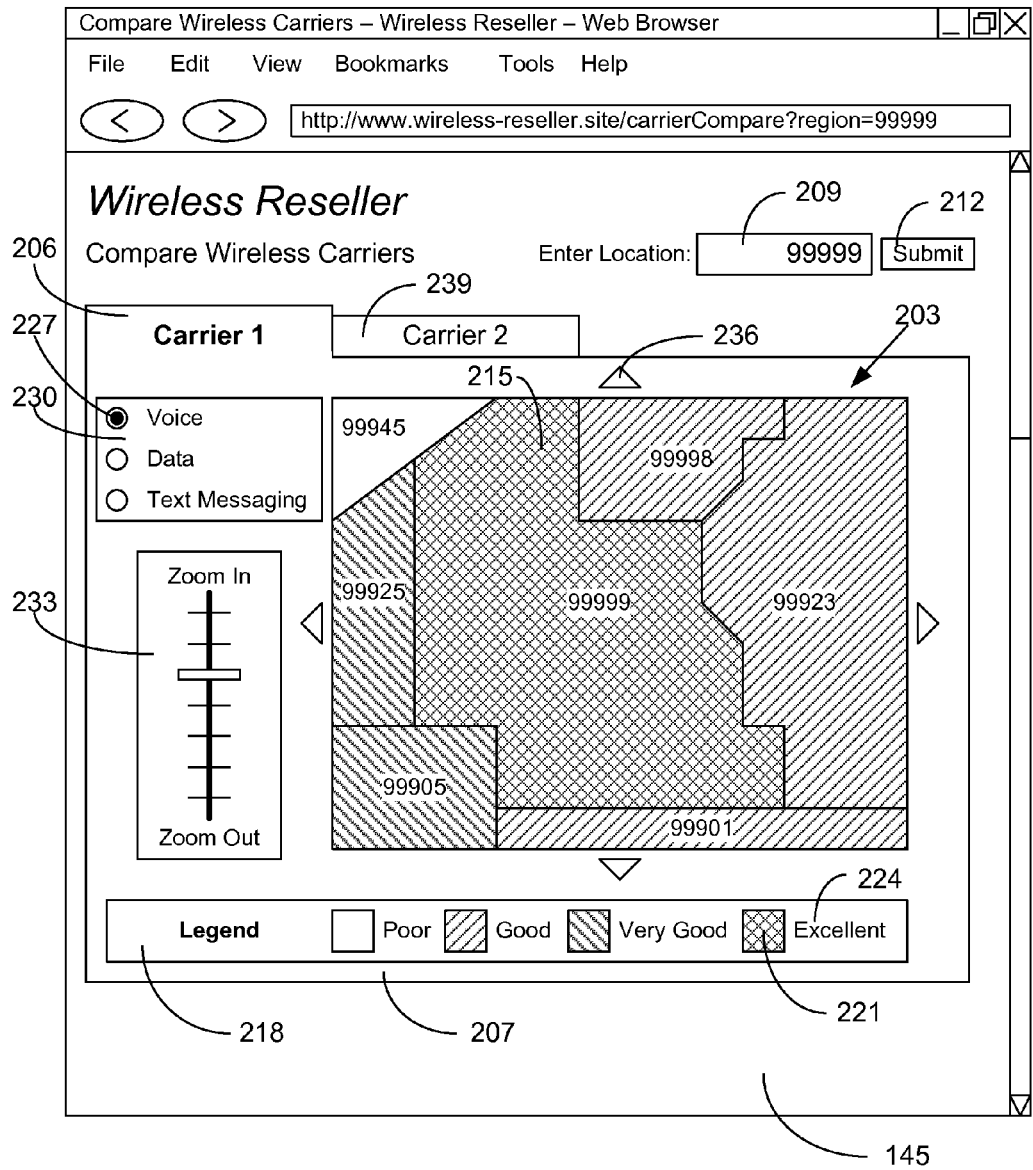
FIGS. 2 and 3 are drawings of examples of user interfaces rendered by a client in the networked environment of FIG. 1 according to various embodiments of the present disclosure.

Referring next to FIG. 2, shown is a drawing of a user interface 200 rendered by a browser 139 (FIG. 1) executing in a client 106 (FIG. 1) in the networked environment 100 (FIG. 1) according to various embodiments of the present disclosure. Specifically, the user interface 200 depicts one example of a rendered network page 145. In this example, a map 203 is shown for "Carrier 1" in a selected tab 206 in a common display region 207. The map 203 has been generated by the rating presentation application 121 (FIG. 1) according to a target region or geographic location identified by a user in a location entry component 209.

On a previously rendered network page 145, the user entered the zip code "99999" in the location entry component 209. The location entry component 209 may comprise a text field, a text area, a clickable map, and/or any other user interface component allowing for a location or region to be specified by a user. A location submit component 212 may be present in some embodiments to trigger the sending of the location or region to the rating presentation application 121. The location submit component 212 may comprise, for example, a button or another user interface component. In other embodiments, the location or region may be determined automatically by the rating presentation application 121 without a location entry component 209 in the user interface 200.

The map 203 illustrates several regions 215, including the target region 215 ("99999"). In this example, the map 203 is focused or centered about the target region 215, although the map 203 may have different points of focus in other embodiments. Each of the regions 215 graphically indicates an aggregate customer rating associated with the respective region 215. The aggregate customer rating is determined based at least in part on a subset of the customer ratings that are associated with geographic locations encompassed by the respective region 215. In this example, an aggregate customer rating is indicated by a fill pattern applied to the respective region, although different colors or indicia may be used instead. The legend 218 indicates the different patterns 221 that may be used on the map 203, along with a description of the level of rating 224 associated with a corresponding pattern 221.

The map 203 indicates the aggregate customer ratings for a selected dimension 227 of "voice." The dimension panel 230 permits the selection of one or more dimensions 227 to be used in rendering the map 203. Although the dimensions panel 230 is depicted using a plurality of radio buttons, it is understood that other types of user interface components may be substituted, such as, for example, checkboxes, drop-down menus, buttons, etc. In other embodiments, multiple dimensions may be shown on the same map 203 simultaneously using different colors, patterns, or other indicia. In other embodiments, textual reviews and/or other customer experience data 133 may also be featured in the rendered network page 145 and associated with a respective region 215.

As illustrated, for "Carrier 1," the region 215 labeled "99999" is rated to have excellent voice coverage, the regions 215 labeled "99905" and "99925" are rated to have very good voice coverage, the regions 215 labeled "99901," "99923," and "99998" are rated to have good voice coverage, and the region 215 labeled "99945" is rated to have poor voice coverage. The aggregate ratings are based on the customer experience data 133 (FIG. 1) that is associated with the respective region 215.

The user interface 200 may also include a zoom tool 233 to allow zoom in and zoom out functions to be performed for the map 203. Although the zoom tool 233 is depicted as a slider, it is understood that the zoom tool 233 may comprise any user interface component in other embodiments, such as, for example, buttons, checkboxes, drop-down menus, radio buttons, and other components. The user interface 200 may also include a pan tool 236 to allow the view of the map 203 to be panned in one or more directions. Although the pan tool 236 is depicted as a plurality of buttons, it is understood that the pan tool 236 may comprise any user interface component in other embodiments, such as, for example, sliders, checkboxes, drop-down menus, radio buttons, and other components. Panning and zooming functions may also be performed, for example, through using mouse clicks and mouse movement on the map 203, a scroll wheel, keyboard shortcuts, and other user input actions.

The map 203 rendered in the common display region 207 may be selected by the user from a plurality of maps 203. In this example, selection of a non-selected tab 239 would update the map 203 and other user interface components for another wireless carrier, "Carrier 2." In other embodiments, a plurality of maps 203 may be rendered at the same time on the same rendered network page 145 in different regions or may be accessible through links to other network pages 142 (FIG. 1).

Figure 3:
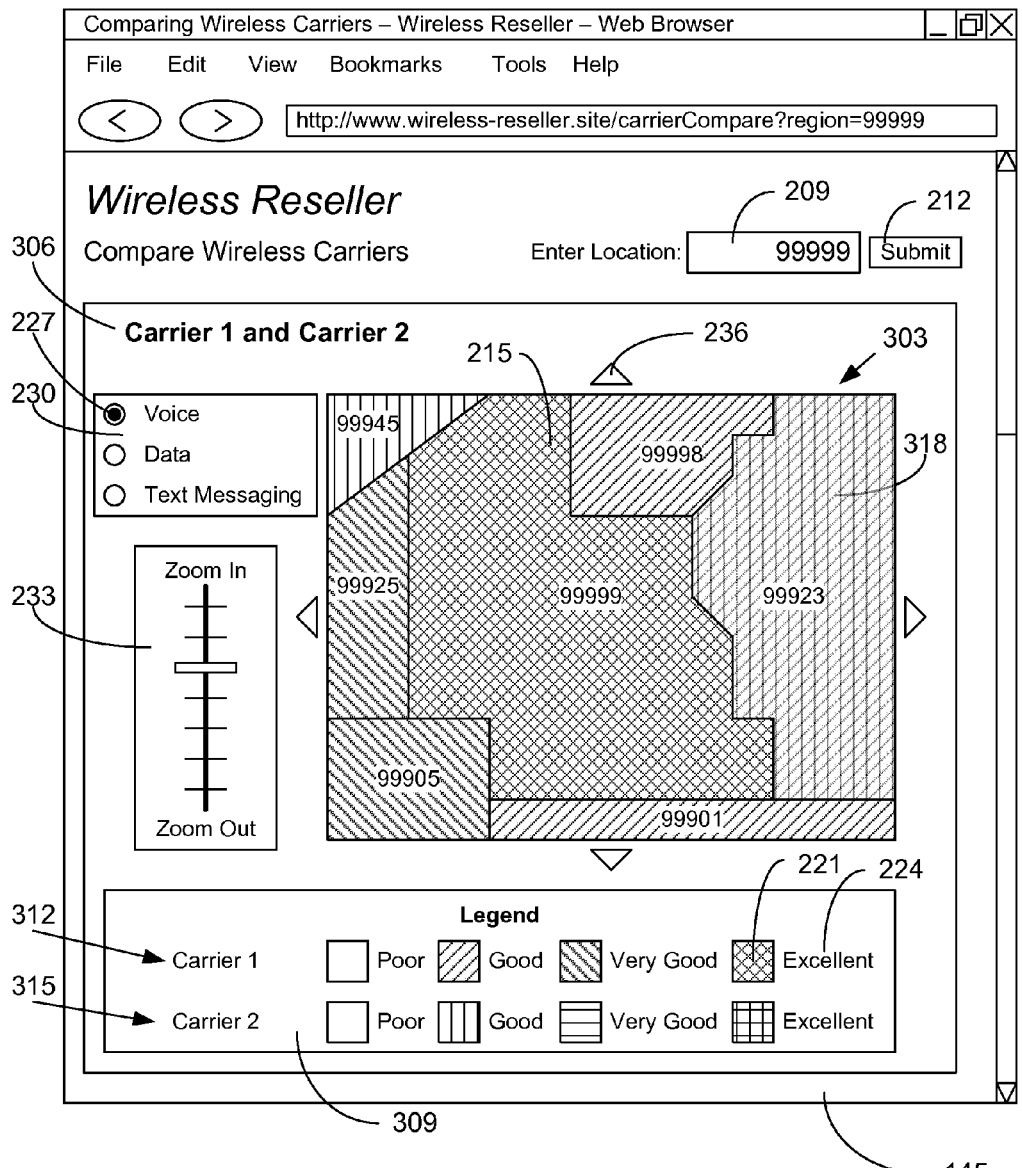

Moving on to FIG. 3, shown is a drawing of a user interface 300 rendered by a browser 139 (FIG. 1) executing in a client 106 (FIG. 1) in the networked environment 100 (FIG. 1) according to various embodiments of the present disclosure. Specifically, the user interface 300 illustrates another example of a rendered network page 145. In this example, a map 303 illustrates aggregate customer ratings for two wireless carriers simultaneously. The display region 306 is updated for "Carrier 1 and Carrier 2."

The legend 309 is updated for both wireless carriers. Each of the rows 312, 315 show distinct patterns 221 such that the level of rating 224 may be discerned for any combination of overlapping patterns 221. As noted previously, different colors or indicia may be used. As a non-limiting example, patterns 221 may be used for one wireless carrier, while colors are used for another wireless carrier. As another non-limiting example, primary colors may be used so that the primary colors may be distinguished from any intermediate colors caused by overlap. The region 318 labeled "99923" shows an overlap of two patterns 221: a "good" pattern 221 for "Carrier 2" overlaps the "good" pattern for "Carrier 1." In one embodiment, the user interface 300 may have one or more components for the user to select a region 318 to enable textual reviews from customers associated with the region 318 to be displayed.

As illustrated, for "Carrier 1," the region 318 labeled "99999" is rated to have excellent voice coverage, the regions 318 labeled "99905" and "99925" are rated to have very good voice coverage, the regions 318 labeled "99901," "99923," and "99998" are rated to have good voice coverage, and the region 318 labeled "99945" is rated to have poor voice coverage. For "Carrier 2," the regions 318 labeled "99925," "99905," "99999," "99901," and "99998" are rated to have poor voice coverage (i.e., they have no overlapping vertical pattern 221), and the regions 318 labeled "99945" and "99923" are rated to have good voice coverage. Although only voice coverage ratings are displayed on the map 303, it is understood that the map 303 may show multidimensional aggregate customer ratings in other embodiments. In other embodiments, the user interface 300 may provide the ability to toggle between ratings for different ones of the wireless carriers.

Figure 4:
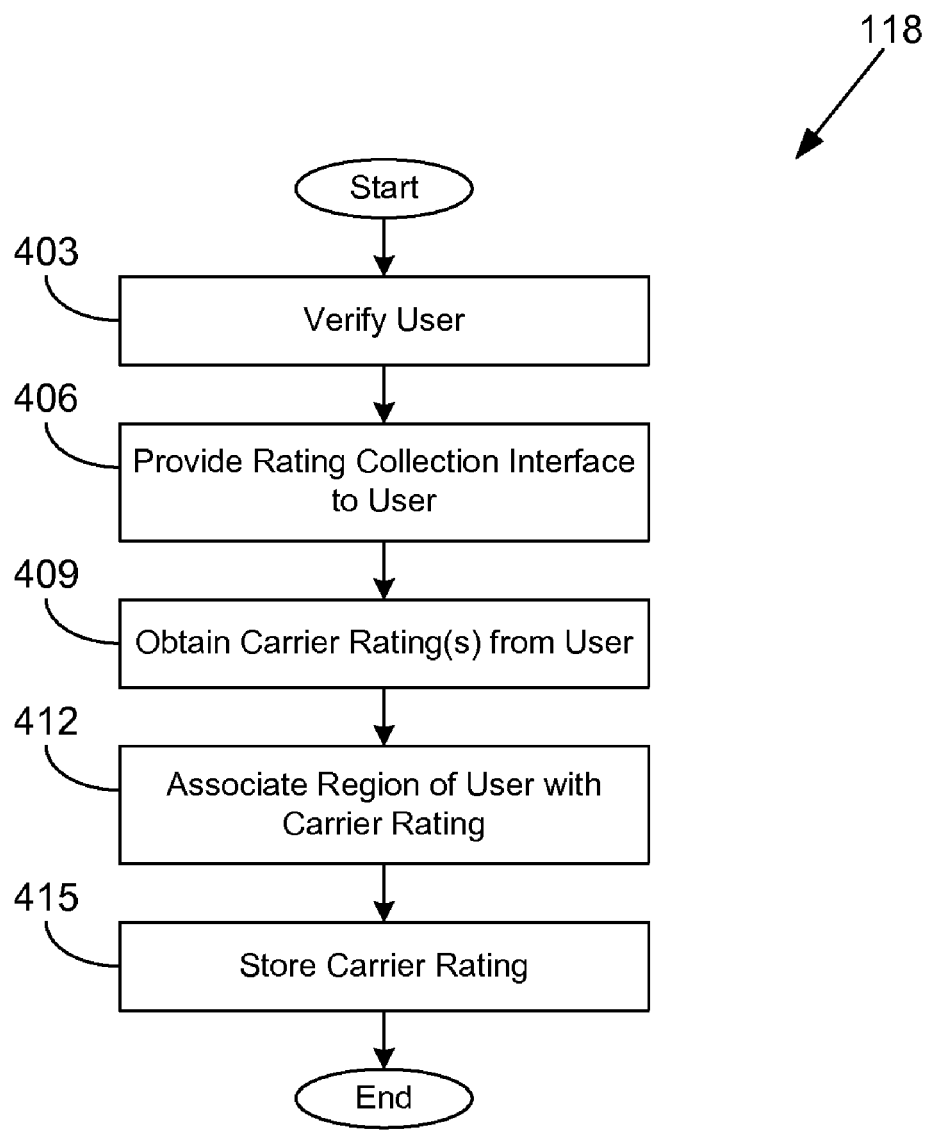
FIG. 4 is a flowchart illustrating one example of functionality implemented as portions of a rating collection application executed in a computing device in the networked environment of FIG. 1 according to various embodiments of the present disclosure.

Referring next to FIG. 4, shown is a flowchart that provides one example of the operation of a portion of the rating collection application 118 according to various embodiments. It is understood that the flowchart of FIG. 4 provides merely an example of the many different types of functional arrangements that may be employed to implement the operation of the portion of the rating collection application 118 as described herein. As an alternative, the flowchart of FIG. 4 may be viewed as depicting an example of steps of a method implemented in the computing device 103 (FIG. 1) according to one or more embodiments.

Beginning with box 403, the identity of a user is verified by the rating collection application 118. A user may explicitly provide a security credential, or the identity may be verified according to a cookie obtained from the browser 139 (FIG. 1), the IP address associated with the client 106 (FIG. 1) or the wireless device 109 (FIG. 1), or the telephone number associated with the wireless device 109. In one embodiment, an application executing on another computing device 103 may be consulted to verify the identity of the user. The geographic location or region associated with the user may be determined based on the identity of the user. In other embodiments, the verification task may be absent or may be optional.

In box 406, the rating collection application 118 provides a rating collection interface to the user. In one embodiment, the rating collection interface may comprise one or more network pages 142 (FIG. 1) configured to solicit feedback regarding a wireless carrier from the user. The network page(s) 142 may be sent over the network 112 for rendering in the client 106 or the wireless device 109. In another embodiment, the rating collection interface may be a voice-channel interface configured to gain input from the user (e.g., voice recognition or touch tone) at the wireless device 109. In another embodiment, the rating collection interface may be configured to parse a text message received from the wireless device 109. In box 409, the rating collection application 118 obtains one or more wireless carrier ratings from the user. In other embodiments, the rating collection application 118 may be configured to obtain the wireless carrier ratings from a wireless device 109 of the user without specific user input.

Next, in box 412, the rating collection application 118 associates a region of the user with the obtained carrier rating(s). In box 415, the rating collection application 118 stores the carrier rating(s) in the customer experience data 133 (FIG. 1). Thereafter, the portion of the rating collection application 118 ends.

Figure 5:
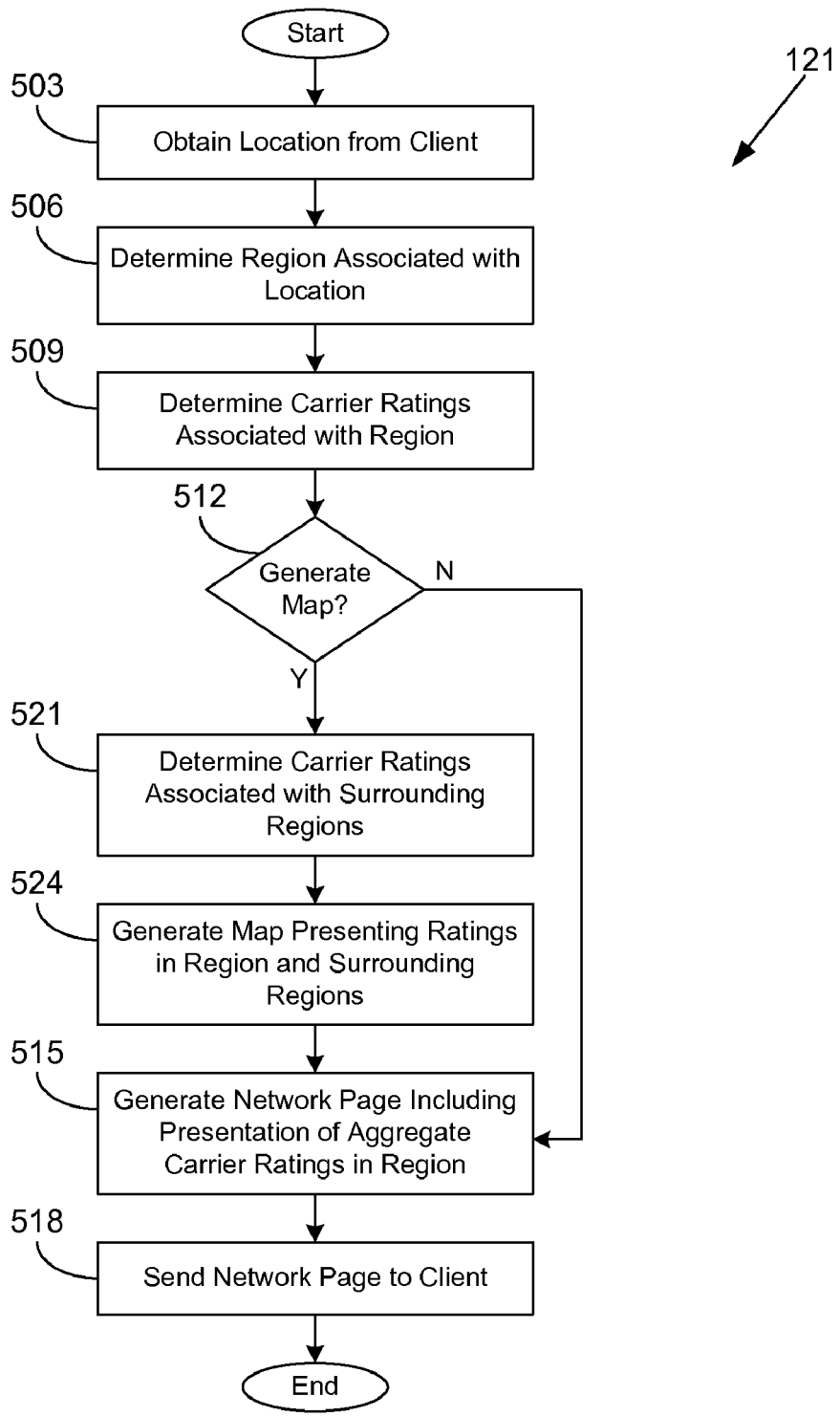
FIG. 5 is a flowchart illustrating one example of functionality implemented as portions of a rating presentation application executed in a computing device in the networked environment of FIG. 1 according to various embodiments of the present disclosure.

Turning now to FIG. 5, shown is a flowchart that provides one example of the operation of a portion of the rating presentation application 121 according to various embodiments. It is understood that the flowchart of FIG. 5 provides merely an example of the many different types of functional arrangements that may be employed to implement the operation of the portion of the rating presentation application 121 as described herein. As an alternative, the flowchart of FIG. 5 may be viewed as depicting an example of steps of a method implemented in the computing device 103 (FIG. 1) according to one or more embodiments.

Beginning with box 503, the rating presentation application 121 obtains a geographic location from the client 106 (FIG. 1). In other embodiments, the location may comprise a region. In other embodiments, the location and/or region may be determined automatically for the client 106. In box 506, the rating presentation application 121 determines a region associated with the location if no region was obtained in box 503. In box 509, the rating presentation application 121 determines a subset of carrier ratings that are associated with the region. In other words, the carrier ratings in the subset of carrier ratings are each associated with a geographic location that is encompassed by the region.

In box 512, the rating presentation application 121 determines whether a map is to be generated. If a map is not to be generated, the rating presentation application 121 proceeds to box 515 and generates a network page 142 (FIG. 1) including a presentation of the aggregate carrier ratings in the region. For example, the network page 142 may include a recommendation for one or more of the wireless carriers that service the region based at least in part on the customer ratings associated with the region. The network page 142 may also include a visualization of the aggregate carrier ratings other than a map in some embodiments. The network page 142 is sent to the client 106 in box 518. Thereafter, the portion of the rating presentation application 121 ends.

If the rating presentation application 121 instead determines in box 512 that a map is to be generated, the rating presentation application 121 moves to box 521 and determines carrier ratings associated with surrounding regions. Next, in box 524, the rating presentation application 121 generates one or more maps presenting the aggregate customer ratings of the wireless carrier in the target region and surrounding regions.

In box 515, the rating presentation application 121 generates a network page 142 including a presentation of the aggregate carrier ratings in the region. In this case, the network page 142 may include the maps generated in box 524. The network page 142 is sent to the client 106 in box 518. Thereafter, the portion of the rating presentation application 121 ends.

Figure 6:
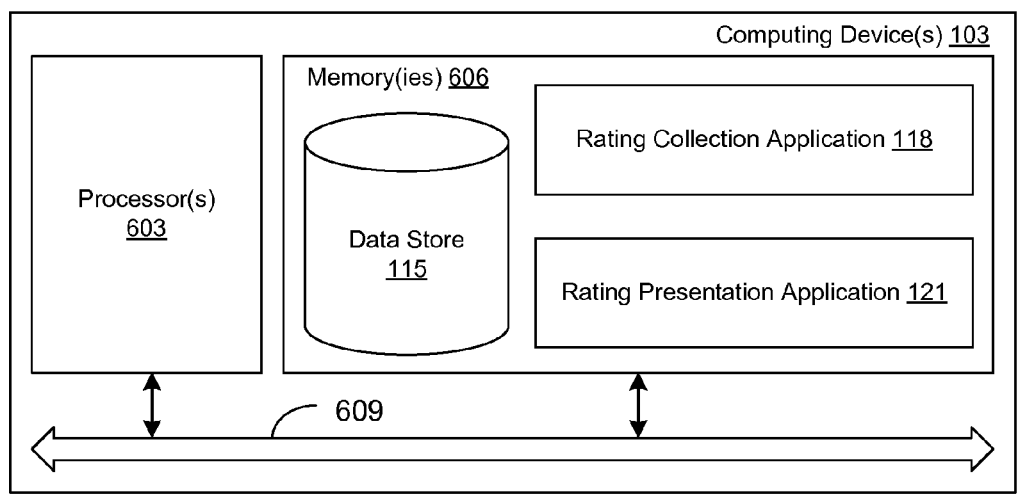
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are data and several other components that are executable by the processor 603. In particular, stored in the memory 606 and executable by the processor 603 are the rating collection application 118, the rating presentation application 121, and potentially other applications. Also stored in the memory 606 may be a data store 115 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 112 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the rating collection application 118, the rating presentation application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the rating collection application 118 and the rating presentation application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the rating collection application 118 and the rating presentation application 121, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, the program comprising:
    code that collects a plurality of customer ratings for a plurality of wireless carriers, each of the customer ratings being associated with a corresponding geographic location and evaluating one of the wireless carriers on a plurality of dimensions;
    code that determines a target region according to data obtained from a client;
    code that provides a subset of the customer ratings that are associated with a subset of the wireless carriers that offer service to the target region, the subset of customer ratings also being associated with geographic locations that are encompassed by the target region;
    code that encodes for rendering by the client at least one map showing the target region, the at least one map indicating an aggregate rating in each one of the dimensions for each of at least two of the subset of the wireless carriers in the target region, the aggregate rating being determined from the subset of the customer ratings; and
    code that sends a network page including the at least one map to the client.

2. The non-transitory computer-readable medium of claim 1, wherein the network page includes at least one component configured to obtain a user selection of one of the dimensions in order to select the aggregate ratings that are indicated by the at least one map.

3. The non-transitory computer-readable medium of claim 1, wherein the network page includes at least one component configured to obtain a user selection of one of the subset of the wireless carriers in order to select the aggregate ratings that are indicated by the at least one map.

4. A system, comprising:
    at least one computing device;
    a rating collection application executable in the at least one computing device, the rating collection application comprising:
        logic that obtains a plurality of user ratings for a plurality of wireless carriers, each of the user ratings being associated with a corresponding geographic location; and
    a rating presentation application executable in the at least one computing device, the rating presentation application comprising:
        logic that identifies a target region according to data obtained from a client;
        logic that encodes at least one map depicting at least the target region for rendering in the client, the at least one map graphically indicating an aggregate user rating for the at least one of the wireless carriers, the aggregate user rating being determined based at least in part on a subset of the user ratings that are associated with geographic locations that are encompassed by the target region; and logic that generates a network page including the at least one map.

5. The system of claim 4, wherein the rating presentation application further comprises logic that obtains a selected subset of a plurality of dimensions used in rating the wireless carriers from the client.

6. The system of claim 5, wherein at least some of the dimensions correspond to features offered by at least one of the wireless carriers.

7. The system of claim 5, wherein the rating presentation application further comprises logic that generates a recommendation for one of the wireless carriers based at least in part on the selected subset of the dimensions and an availability of service in the target region from the one of the wireless carriers, and the network page includes the recommendation.

8. The system of claim 4, wherein at least one of the user ratings is obtained from a wireless device.

9. The system of claim 8, wherein the geographic location associated with the at least one of the user ratings corresponds to a geographic location of the wireless device determined when the at least one of the user ratings is obtained from the wireless device.

10. The system of claim 4, wherein at least some of the geographic locations associated with the user ratings each correspond to a service location of a respective user.

11. The system of claim 4, wherein the target region is defined according to a postal code.

12. The system of claim 4, wherein the target region is defined according to a distance from a geographic location.

13. The system of claim 4, wherein the network page includes a plurality of user comments associated with the subset of the user ratings.

14. The system of claim 4, wherein the aggregate user ratings for a plurality of the wireless carriers are graphically indicated on one of the at least one map.

15. The system of claim 4, wherein a first one of the at least one map graphically indicates the aggregate user rating for the at least one of the wireless carriers in a first dimension, and a second one of the at least one map graphically indicates the aggregate user rating for the at least one of the wireless carriers in a second dimension.

16. The system of claim 4, wherein the at least one map depicts the target region and at least one other contiguous region.

17. The system of claim 16, wherein the at least one map graphically indicates a different aggregate user rating for at least one of the wireless carriers for the at least one other contiguous region determined based at least in part on a subset of the user ratings that are associated with geographic locations that are encompassed by the at least one other contiguous region.

18. The system of claim 4, wherein the rating collection application further comprises logic that generates a map that facilitates a user specification of the geographic location for a corresponding at least one of the user ratings.

19. A method, comprising the steps of:

collecting, in at least one computing device, a plurality of customer ratings for a plurality of wireless carriers, each of the customer ratings being associated with a corresponding geographic location;

obtaining, in the at least one computing device, a target geographic location from a client; and generating, in the at least one computing device, a network page including at least one map showing a region encompassing the target geographic location, the at least one map indicating an aggregate customer rating for at least one of the wireless carriers for the region, the aggregate customer rating being determined based at least in part on a subset of the customer ratings that are associated with geographic locations that are encompassed by the region.

20. The method of claim 19, further comprising the step of verifying, in the at least one computing device, an identity of a customer before collecting a customer rating for one of the wireless carriers from the customer.

21. The method of claim 19, wherein each one of the at least one map corresponds to a respective one of the at least one of the wireless carriers.

22. The method of claim 19, wherein each one of the at least one map is configured to be selectable by a user for rendering in a common display region of the network page.

23. The method of claim 19, wherein each of the at least one of the wireless carriers is determined to provide service to the region.

24. The method of claim 19, wherein the at least one map shows a plurality of regions, and the at least one map indicates a corresponding aggregate customer rating for at least one of the wireless carriers for each of the regions, each aggregate customer rating being determined based at least in part on a subset of the customer ratings that are associated with geographic locations that are encompassed by the corresponding region.

25. The method of claim 19, wherein each of the customer ratings is multi-dimensional.

26. The method of claim 19, wherein the at least one map is configured to indicate at least a selected one of a plurality of dimensions associated with the aggregate customer rating.

* * * * *